United States Patent [19]

Robitzsch

[11] 4,398,209

[45] Aug. 9, 1983

[54] METHOD AND APPARATUS FOR DIGITAL CONTROL OF A SEPARATELY CODED COLOR TELEVISION SIGNAL

[75] Inventor: Herbert Robitzsch, Erzhausen, Fed. Rep. of Germany

[73] Assignee: Robert Bosch GmbH, Stuttgart, Fed. Rep. of Germany

[21] Appl. No.: 258,026

[22] Filed: Apr. 27, 1981

[30] Foreign Application Priority Data

Apr. 25, 1980 [DE] Fed. Rep. of Germany ....... 3015932

[51] Int. Cl.³ .......................................... H04N 9/535
[52] U.S. Cl. ........................................ 358/27; 358/13
[58] Field of Search ................... 358/13, 21 R, 35, 27, 358/39

[56] References Cited

U.S. PATENT DOCUMENTS 4,163,248  7/1979  Heitmann .............................. 358/13
4,275,411  6/1981  Lippel .................................. 358/13
4,322,739  3/1982  Drewery et al. ...................... 358/13

Primary Examiner—Richard Murray
Attorney, Agent, or Firm—Frishauf, Holtz, Goodman & Woodward

[57] ABSTRACT

Undesired color discontinuities in the display of color television signals which were processed digitally and which have separately coded luminance and chrominance signals are eliminated by controlling the luminance signals with a broadband control signal and the chrominance signals with a narrowband control signal. For this purpose, the available broadband control signal is filtered to create the narrowband signal and a multiplexer is provided to apply either the filter output or the broadband signal to a multiplier whose second set of inputs receives luminance and chrominance signals in a predetermined order in each cycle.

7 Claims, 1 Drawing Figure

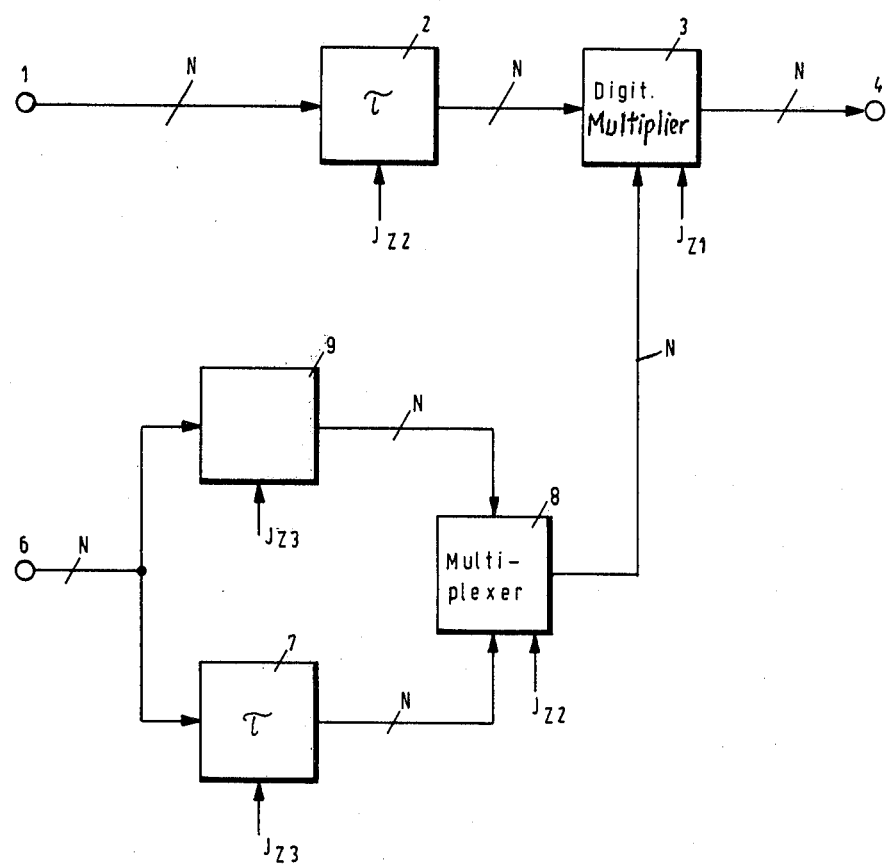

METHOD AND APPARATUS FOR DIGITAL CONTROL OF A SEPARATELY CODED COLOR TELEVISION SIGNAL

The present invention relates to a method and system for the digital control of a separately coded digital color television signal.

Background.

The necessity for digital processing of analog color television signals arose with th introduction of much digital processing equipment as, for example, digital mixers, synchronizing apparatus and recording apparatus. The digitalization of the color television signal can be accomplished in two ways. In the first, a color television signal available as an NTSC, PAL or SECAM signal, is scanned as such and digitalized. In the second, a separate coding process takes place in which the available color television signal is separated into a luminance signal and a chrominance signal and subsequently digitalized. This separate coding method is preferred because it is independent of the type of analog color television system and thus compatibility between the systems, for example between the SECAM and the PAL system can be achieved, thereby eliminating the need for an additional code conversion.

In general, the data for each of these above-mentioned signal components (luminance, chrominance) consists of 8-bit words with linear pulse code modulation. These 8-bit words are time-multiplexed, arranged in periodic cycles and transmitted in parallel. To match the properties of human perception, the bandwidth of the chrominance signals U and V is chosen to be substantially smaller than that of the luminance signals. For example, the bandwidth for the chrominance signals may be 1.3 MHz, while that of the luminance signals may be in the range of between 5 and 6 MHz. The scanning frequencies for the luminance signals differ from those of the chrominance signals, the scanning frequency for the latter being substantially less than that for the former. The scanning frequencies are generally chosen to be a multiple of the line frequency.

The so-coded color television signal may then be transmitted in a time-multiplex process in a number of ways. Preferred at the moment is a 3-1-1 or a 2-1-1 data stream, that is the transmission of Y-U-Y-V-Y or Y-U-Y-V per cycle. If this data stream is applied to a control unit for signal amplification or damping (e.g. a multiplier), color errors can occur from the fact that the associate Y-, U- or V-data values of a cycle are treated differently dynamically.

One way of overcoming this difficulty would be to allow a change in the control signal only at the start of a cycle. This however would lead to a control signal resolution with respect to time in the horizontal direction which is much smaller than the resolution in the analog systems. Specifically, while the resolution in the analog system can be made as fine as desired, that in the digital system would be approximately 1200 scanning values per line divided by the length of the cycle. For the above example of a 3-1-1 data stream, a resolution of only 240 steps would be available. This results in discontinuities in color which are clearly visible.

The Invention.

It is an object of the present invention to furnish a method and system which, in a digitally controlled color television system, eliminates the above-mentioned color discontinuities and color errors.

DRAWING

The single FIGURE is a block diagram of an apparatus carrying out the method of the invention.

DESCRIPTION OF THE PREFERRED EMBODIMENT

The figure shows a circuit for digital control, for example amplification, of a digital color television signal. A separately coded color television signal having a luminance signal Y and both chrominance components U and V is available at input terminal 1. The signal components are transmitted in periodic cycles, in the 2-1-1 mode for example Y-U-Y-V, sequentially with respect to time. The bandwidth for the scanning frequency of th luminance signal Y is 12 MHz and for each of the chrominance signals U and V it is 6 MHz. Since the transmission takes place in pulse code modulation with a resolution of $N=8$ bits, $N=8$ lines are required for transmission.

The digital signal applied at terminal 1 is first subjected to a delay in th delay unit 2 required to match the delay time in filter 9 to be discussed below. This unit consists of an 8 bit wide N bit long shift register, that is clocked by the sample clock. The sample clock may be generated in this unit by a phase locked loop circuit by the clock Z2 (if the sample clock is not available). Thereafter, it is applied to a digital control unit 3. After it has been subjected to the control, the digital color television signal is available at an output terminal 4 for further processing.

A control signal also transmitted with $N=8$ bits is available at terminal 6.

There apperas the same number of samples of control words as the sum of luminance plus chrominance samples, i.e. for example for a typically 2-1-1 system:

12 MHz luminance sample frequency +

12 MHz chrominance sample frequency =

24 MHz control sample frequency.

This control sample frequency must be divided by the line frequency to get the number of control words/line, i.e. in a 625 line/50 Hz system for the example mentioned above 1536 samples/line. The control signal may be derived from an amplitude control circuit or a special-effects generator. Since the signal components Y on the one hand and U and V on the other hand are of different bandwidths, the control signal for these components is derived separately. The full bandwidth of the control signal is utilized for controlling the luminance component Y. Thus, the control signal is subjected to a delay in a delay unit 7 prior to being applied to one set of inputs of a multiplexer 8. The delay unit 7 is just the same like unit 2. Delay length M sampleclocks may be (not must be) different to N of block 2. The control signal available at terminal 6 is also filtered in a low-pass filter 9 so that the signal at the output of low-pass filter 9 is band limited. The filter 9 is a digital filter—clocked by the sample clock—that in the simples application averages the control words of the whole cycle (4 samples in the example above) and outputs at the beginning of the new cycle (started by Z3) the new averaged control word to the second input of the multiplexer 8. The signal at the output of low-pass filter 9, also on $N=8$ lines, is applied to the second set of inputs of multiplexer 8. Multiplexer 8 switches the output of block 7 to the multiplexer 3, every time a luminance word appears at the output of block 2 or switches the output of block 9 to the multiplier while a chroma signal is applied to the multiplier 3 by output of block 2. This switching is therefore clocked by the sample clock of the system and synchronized by Z2. The digital control signal available at the output of multiplexer 8 then has differing bandwidth for controlling the luminance component on the one hand and the chrominance components on the other. This control signal is applied to the control inputs of the digital control circuit 3.

Clock pulses $I_{Z1}$, $I_{Z2}$, $I_{Z3}$ are applied to units 3; 2 and 8; and 7 and 9, respectively, at periods in time signified by the respective indices. Specifically, indices 1, 2 and 3 each signify the respective preceding clock pulse in the cycle, that is when $1=t$, $2=t+1$ and $3=t+2$. The cycle synchronization pulse is always generated at the start of the cycle and the subscripts thus denote cycles which are transmitted sequentially with respect to time. The sample clock is furnished to all blocks of the system (2, 3, 7, 8, 9). The clocks Z1, Z2, Z3, which have the cycle frequency period, only synchronize the status of the block, which is clocked by the sample clocks.

The equipment that surrounds the described block diagram is described in many variations, for example in the three volumes of the series "DIGITAL VIDEO" published by the SMPTE.

Although the invention has been described in a preferred embodiment, modifications and changes thereof will readily be apparent to one skilled in the art and are intended to be included in the following claims.

I claim:

1. Method for digital control of a digital color television signal having individually coded luminance and chrominance signals, comprising the steps of:
   generating a first and second control signal, wherein said first control signal has a first predetermined bandwidth and said second control signal has a second predetermined bandwidth narrower than said first predetermined bandwidth;
   and controlling the amplitude of said luminance and chrominance signals with said first and second control signals, respectively.

2. A method as set forth in claim 1, wherein said chrominance signal is a quadrature modulated signal;
   wherein said luminance signal and said quadrature modulated chrominance signals are transmitted cyclically in a time multiplex process;
   and wherein all chrominance signals within one cycle are controlled by the same value of said second control signal.

3. A method as set forth in claim 1, wherein each of said luminance signals constitutes a luminance signal word and each of said chrominance signals constitutes a chrominance signal word;
   wherein each of said cycles comprises a plurality of said luminance signal words and a plurality of said chrominance signals words, said luminance and chrominance signal words being transmitted in a predetermined order in each of said cycles;
   wherein said first and second control signals constitute first and second control signal words; and
   wherein each of said chrominance signal words and the luminance signal word included between two of said chrominance signal words are controlled by the same one of said second control signal words, and the remainder of said luminance signal words within said cycle are controlled by said first control signal words.

4. Apparatus for digital control of the individually coded digital luminance and chrominance signals together constituting a digital color television signal, comprising
   means (7, 8, 9) for generating first and second control signals; and
   means (3) for applying said first control signals to at least selected ones of said luminance signals and said second control signals to said chrominance signals;
   wherein said means for generating first and second control signals comprises
   means for receiving a broadband control signal,
   means (9) connected to said receiving means for filtering said broadband control signal, thereby creating a narrow-band control signal,
   and multiplexer means connected to said filter means, said receiving means, and said applying means for selectively furnishing
   (a) said broadband control signals or
   (b) said narrow-band control signals to said applying means under control of synchronization signals for controlling the amplitude of the respective luminance and chrominance signals.

5. Apparatus as set forth in claim 4, wherein said applying means comprises multiplier means for multiplying said luminance and chrominance signals by said first and second control signals under control of synchronization signals.

6. Apparatus as set forth in claim 4, further comprising delay means (7) interconnected between said receiving means and said multiplexer means for delaying said broadband control signals in correspondence with the delay of said narrowband control signals in said filter means.

7. Apparatus as set forth in claim 6, further comprising means for delaying said luminance and chrominance signals prior to application to said applying means.

* * * * *